(12) United States Patent
Zander et al.

(10) Patent No.: US 6,292,632 B1
(45) Date of Patent: Sep. 18, 2001

(54) EXPOSURE COUNT INDICATOR FOR CAMERA

(75) Inventors: Dennis R. Zander, Penfield; Patricia L. Williams, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/503,368

(22) Filed: Feb. 14, 2000

(51) Int. Cl.[7] .................................................. G03B 1/66
(52) U.S. Cl. ................................................... 396/284
(58) Field of Search ................................... 396/284, 285, 396/281; 359/436

(56) References Cited

U.S. PATENT DOCUMENTS

| | | | |
|---|---|---|---|
| 1,839,517 | * 1/1932 | Wildhaber et al. | 396/284 |
| 2,007,344 | * 7/1935 | Renger | 396/284 |
| 2,917,981 | 12/1959 | Sewig | 396/412 |
| 4,037,235 | * 7/1977 | Ueda | 396/281 |
| 4,896,180 | 1/1990 | Lawther | 396/284 |

* cited by examiner

*Primary Examiner*—W. B. Perkey
(74) *Attorney, Agent, or Firm*—Roger A. Fields

(57) ABSTRACT

An exposure count indicator has a scale of successive exposure count indicia for visually indicating which film frame is positioned for exposure in a camera, and a confirmation indicator separate from the exposure count indicia for providing a visual confirmation indication that a first available frame is positioned for exposure in the camera. A pointer is supported to move from pointing to a pre-initialization one of the exposure count indicia for visually indicating that the first available frame has not been positioned for exposure in the camera to pointing to a successive one of the exposure count indicia for visually indicating that the first available frame is positioned for exposure. The confirmation indicator is capable of modifying light transmitted through it to prevent objects behind it from being clearly seen, and is fixed adjacent the pre-initialization one of the exposure count indicia to cover the pointer when the pointer points to the pre-initialization one of the exposure count indicia, in order that the pointer cannot be clearly seen, but not to cover the pointer when the pointer points to the successive one of the exposure count indicia, in order that the pointer can at least be partially clearly seen. Thus, the changeover from the pointer not being clearly seen to being at least partially clearly seen provides the visual confirmation.

6 Claims, 4 Drawing Sheets

EXPOSURE COUNT INDICATOR FOR CAMERA

CROSS-REFERENCE TO RELATED APPLICATION

Reference is made to commonly assigned copending application Ser. No. 09/503,369, entitled EXPOSURE COUNT INDICATOR FOR CAMERA and filed Feb. 14, 2000 in the name of Dennis R. Zander.

FIELD OF THE INVENTION

The invention relates generally to the field of photography, and in particular to an exposure count indicator for a camera.

BACKGROUND OF THE INVENTION

Practically every camera that is available today includes an exposure count indicator. Typically, the exposure count indicator provides a visible indication of the number of film frames that remain available to be exposed on a filmstrip in the camera, i.e. the current number of exposures that can be made on the filmstrip. Conversely, the exposure count indicator can provide a visible indication of the number of film frames actually exposed on the filmstrip, i.e. the number of exposures actually made. In either case, the exposure count indicator includes a numerical scale of successive exposure count indicia that are evenly spaced from one another. The scale of indicia at least range from the number "1" which indicates either that only one frame remains available to be exposed on the filmstrip, or only one frame has been actually exposed, to a higher number which is the maximum number of exposures, for example "15", "24" or "40".

Each time one of the film frames is positioned for exposure in the camera, the exposure count indicator undergoes an indicia change.

PRIOR ART PROBLEM

A known problem described in commonly assigned prior art U.S. Pat. No. 4,896,180 issued Jan. 23, 1990 is that it may be difficult for one to clearly tell when the first available frame is positioned for exposure in the camera. Typically, the exposure count indicia include a pre-initialization indicia, e.g. "E" or "0", used to provide a visual indication that the first available frame has not been positioned for exposure and a successive indicia, e.g. "1", used to provide a visual indication that the first available frame is positioned for exposure. A series of at least two dot-like or equivalent intermediate indicia are spaced between the pre-initialization indicia "E" or "0" and the successive indicia "1". This is because the filmstrip must be advanced at least three frame widths in the camera before the first available frame is positioned for exposure. A viewing window in the housing of the camera permits one to initially see the pre-initialization indicia "E" or "0", then see the intermediate dot-like indicia, and then see the successive indicia "1". The window is wide enough for one to see more than one of these four indicia. Thus, the patent proposes that a confirmation indicator separate from these indicia be used to provide a visual confirmation indication when the successive indicia "1" is properly in place in the window. The visual confirmation indication reassures one that the first available frame is positioned for exposure.

THE CROSS-REFERENCED APPLICATION

The cross-referenced application discloses an exposure count indicator having a scale of successive exposure count indicia for visually indicating which film frame is positioned for exposure in a camera, and a confirmation indicator separate from the exposure count indicia for providing a visual confirmation indication that a first available frame is positioned for exposure in the camera. The confirmation indicator includes a light-transmitting indicator arranged on a single-color background and a separate two-color changeover including a smaller portion that has a color indistinguishable from the color of the background, and which when superimposed to the light-transmitting indicator renders the light-transmitting indicator substantially indistinguishable from the background, and a larger portion that has a color distinguishable from the color of the background, and which when superimposed to the light-transmitting indicator renders the light-transmitting indicator distinguishable from the background. A support supports the two-color changeover for movement relative to the light-transmitting indicator to change the smaller portion from being superimposed to the light-transmitting indicator to the larger portion being superimposed to the light-transmitting indicator, in order to provide the visual confirmation indication.

SUMMARY OF THE INVENTION

An exposure count indicator comprising a scale of successive exposure count indicia for visually indicating which film frame is positioned for exposure in a camera, and a confirmation indicator separate from the exposure count indicia for providing a visual confirmation indication that a first available frame is positioned for exposure in the camera, is characterized in that:

a pointer is supported to move from pointing to a pre-initialization one of the exposure count indicia for visually indicating that the first available frame has not been positioned for exposure in the camera to pointing to a successive one of the exposure count indicia for visually indicating that the first available frame is positioned for exposure; and the confirmation indicator is capable of modifying light transmitted through it to prevent objects behind it from being clearly seen, and is fixed adjacent the pre-initialization one of the exposure count indicia to cover the pointer when the pointer points to the pre-initialization one of the exposure count indicia, in order that the pointer cannot be clearly seen, but not to cover the pointer when the pointer points to the successive one of the exposure count indicia, in order that the pointer can at least be partially clearly seen, whereby the changeover from the pointer not being clearly seen to being at least partially clearly seen provides the visual confirmation.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
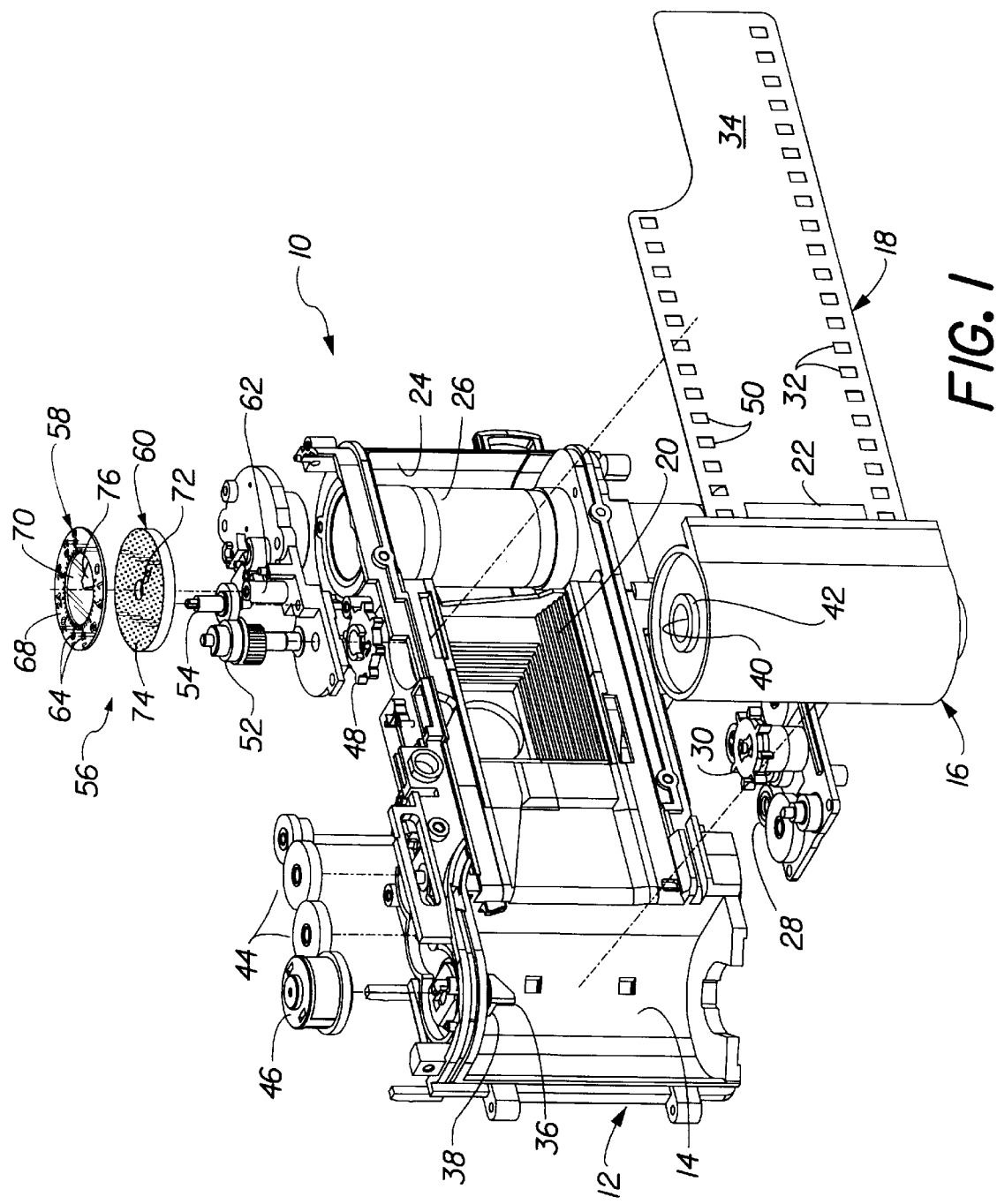
FIG. 1 is a rear exploded perspective view of a camera with an exposure count indicator according to a preferred embodiment of the invention.

Referring now to the drawings, FIG. 1 partially shows a motorized film advance camera 10 comprising a main body part 12 that is housed between a pair of connected front and rear cover parts (not shown). The main body part 12 has a rearwardly open cartridge receiving chamber 14 for a conventional 35 mm film cartridge 16 with a filmstrip 18, a rearwardly open backframe opening 20 at which successive frames of the filmstrip beginning with the first available fire 22 are temporarily positioned to be exposed, and a rearwardly open exposed film take-up chamber 24 that contains a film take-up drum 26 for taking up (winding) each exposed frame. A drive motor (not shown) resides inside the drum 26 for rotating the drum.

A bottom gear train segment 28 is driven via the motor to in turn rotate a film advance sprocket 30 in engagement with successive bottom perforations 32 in the filmstrip 18, to advance a leader portion 34 of the filmstrip three frame widths from the film cartridge 16 and onto the film take-up drum 26. See FIG. 1. The drum 26 is motor-driven to rotate faster than the film advance sprocket 30. When the leader portion 34 is engaged with the drum 26, a known clutch (not shown) discontinues motor drive of the film advance sprocket 30. The film advance sprocket 30 is then rotated via engagement with the bottom film perforations 32.

A forked end 36 of a film rewind spindle 38 projects into the cartridge receiving chamber 14 and is received in a top cavity 40 in a protruding end 42 of a film spool inside the film cartridge 16. See FIG. 1. The forked end 36 coaxially engages the film spool within the top cavity 40. When substantially the entire length of the filmstrip 18 has been exposed frame-by-frame at the backframe opening 20, a top gear train segment 44 is driven via the motor to in turn rotate the film rewind spindle 38 at a coaxial spindle cap 46. The film rewind spindle 38 is motor-driven to rotate the film spool inside the film cartridge 16, to rewind the filmstrip 18 continuously from the film take-up drum 26 into the film cartridge.

A film metering sprocket 48 is rotated via engagement with successive top perforations 50 in the filmstrip 18. See FIG. 1. The film metering sprocket 48 is rotationally coupled by means of an intermediate gear 52 to a rotational driver 54 for an exposure count indicator 56.

Figure 2:
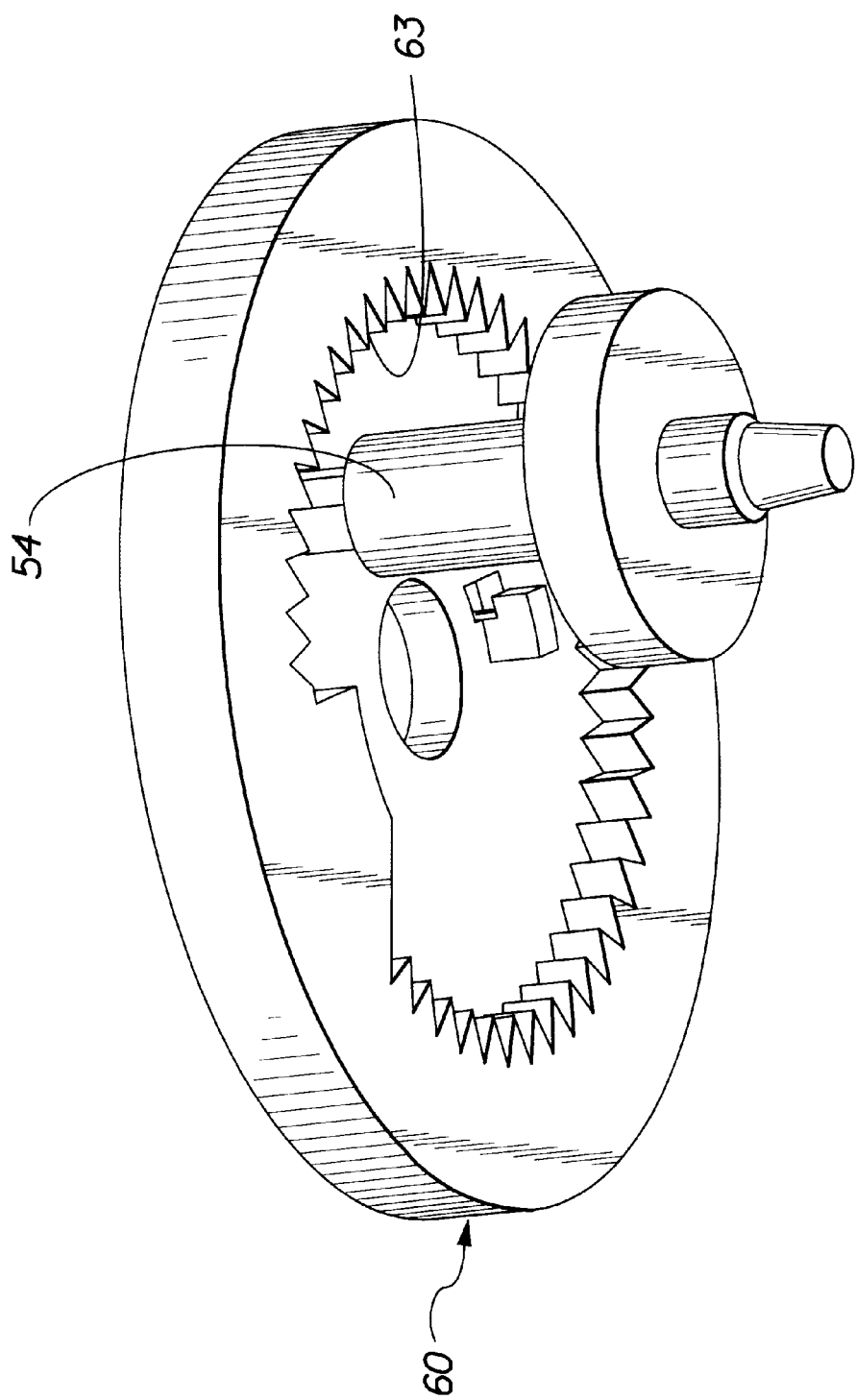
FIG. 2 is a top exploded perspective view of the exposure count indicator.

The exposure count indicator 56 comprises a stationary indicia disk 58 that is fixed within a top opening (not shown) in the front and/or rear cover parts of the camera 10 and an indicator disk 60 that is supported for rotation relative to the indicia disk on a fixed support post 62. See FIG. 1. The rotational driver 54 is rotated in engagement with successive radially inward teeth 63 arranged in a circle on the underside of the indicator disk 60, to rotate the indicator disk. See FIG. 2.

Figure 3:
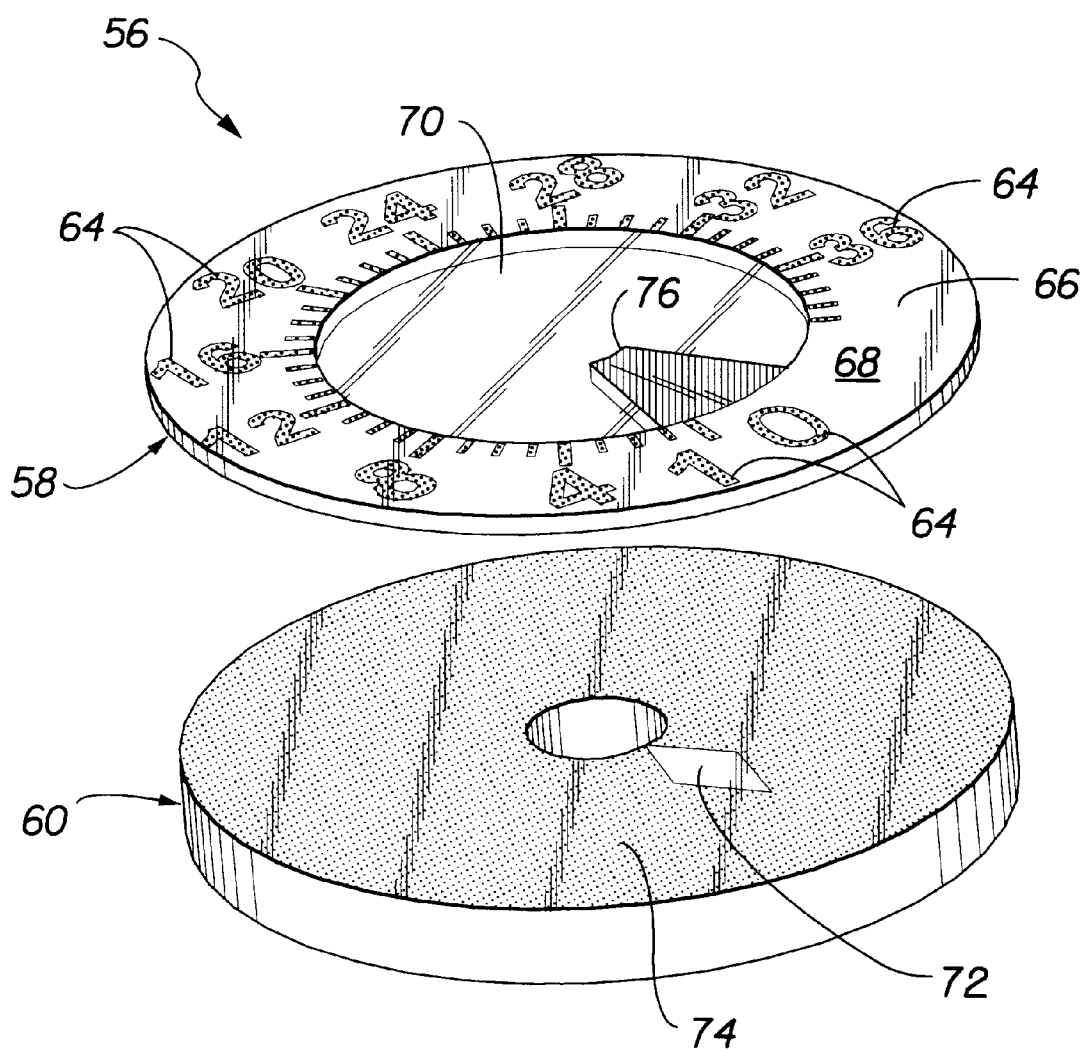
FIG. 3 is a bottom assembled perspective view of the exposure count indicator.

A scale of black-colored exposure count indicia 64 which are the numbers "0"–"36" and the slash marks "/" between each of the numbers are aligned in an outer circle 66 on the indicia disk 58. See FIG. 3. A first one of the exposure count indicia 64, the number "0", serves as a pre-initialization indicia for visually indicating that the first available frame 22 of the filmstrip 18 has not yet been positioned for exposure at the backframe opening 20. A successive one of the exposure count indicia 64, the number "1", is for visually indicating that the first available frame 22 is positioned for exposure at the backframe opening 20. A ring-shaped background 68 for the exposure count indicia 64, on the indicia disk 58, is colored white in contrast to the black-colored indicia. A center portion 70 of the indicia disk 58 is transparent and colorless, or alternatively can be a hole.

The indicator disk 60 has a white-colored radial pointer 72 and a black-colored remaining portion 74.

The indicia disk 58 has a red-colored optical filter 76 that is radially fixed adjacent the pre-initialization one of the exposure count indicia 64, i.e. the number "0". The filter 76 as is known is capable of modifying light transmitted through it, by absorbing color selectively, to prevent objects behind it from being clearly seen. That is the objects can be faintly seen. Alternatively, instead of the filter 76, a translucent optical element that diffuses light transmitted through it can be used.

OPERATION

Figure 4:
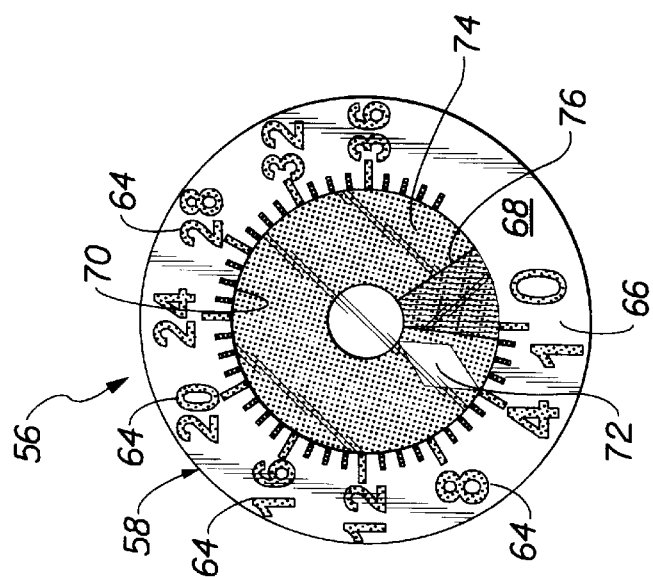
FIGS. 4–6 are top plan views of the exposure count indicator illustrating its operation.

Initially, the indicator disk 60 is oriented relative to the indicia disk 58 as shown in FIG. 4. In this instance, the pointer 72 on the indicator disk 60 is in an original setting pointing to the pre-initialization one of the exposure count indicia 64, i.e. the number "0", on the indicia disk 58 to visually indicate that the first available frame 22 of the filmstrip 18 has not yet been positioned for exposure at the backframe opening 20. Also, the pointer 72 is superimposed to the filter 76, beneath the filter, to prevent the pointer from being clearly seen through the filter (when ambient light is reflected from the pointer through the filter). The pointer 72 can be faintly seen through the filter 72, because it is colored white in contrast to the red color of the filter and the black color of the remaining portion 74 of the indicator disk 60.

Figure 5:
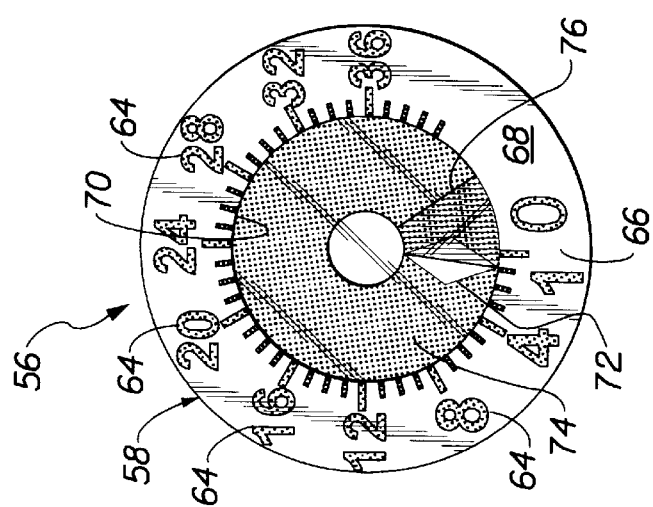

When the film metering sprocket 48 is rotated via engagement with the top perforations 50 in the filmstrip 18, in response to the leader portion 34 of the filmstrip being advanced three frame widths from the film cartridge 16 and onto the film take-up drum 26 to position the first available frame 22 for exposure at the backframe opening 20, the indicator disk 60 is rotated relative to the indicia disk 58 clockwise as shown in FIG. 5. In this instance, the pointer 72 on the indicator disk 60 is swung from its original setting pointing to the pre-initialization one of the exposure count indicia 64, i.e. the number "0", on the indicia disk 58 to a film initialization setting pointing to the successive one of the exposure count indicia, i.e. the number "1", to visually indicate that the first available frame 22 of the filmstrip 18 is positioned for exposure at the backframe opening 20. Also, the pointer 72 has partially emerged from behind the filter 76 to permit it to be clearly seen.

Figure 6:
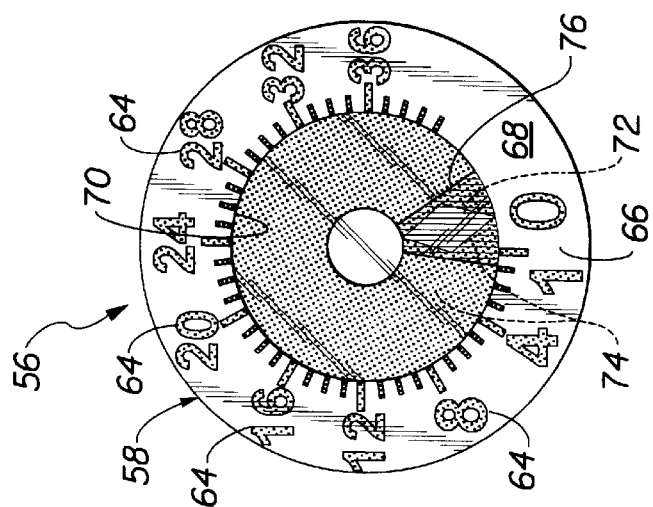

FIG. 6 shows the indicator disk 60 rotated relative to the indicia disk 58 further clockwise as compared to FIG. 5. In this instance, the pointer 72 swung from its film initialization setting pointing to the successive one of the exposure count indicia 64, i.e. the number "1", to another setting pointing to the number "4" of the exposure count indicia to visually indicate that the fourth available frame of the filmstrip 18 is positioned for exposure at the backframe opening 20. Also, the pointer 72 has completely emerged from behind the filter 76 to permit it to be fully seen.

The invention has been described with reference to a preferred embodiment. However, it will be appreciated that variations and modifications can be effected by a person of ordinary skill in the art without departing from the scope of the invention.

PARTS LIST 10. camera
12. main body part 14. cartridge receiving chamber
16. film cartridge
18. filmstrip
20. backframe opening
22. first available frame
24. exposed film take-up chamber
26. film take-up drum
28. bottom gear train segment
30. film advance sprocket
32. bottom film perforations
34. leader portion
36. forked end
38. film rewind spindle
40. top cavity
42. protruding spool end
44. top gear train segment
46. spindle cap
48. film metering sprocket
50. top film perforations
52. intermediate gear
54. rotational driver
56. exposure count indicator
58. indicia disk
60. indicator disk
62. support post
63. teeth
64. exposure count indicia
66. outer circle
68. background
70. center portion
72. pointer
74. remaining portion
76. filter

What is claimed is:

1. An exposure count indicator comprising a scale of successive exposure count indicia for visually indicating which film frame is positioned for exposure in a camera, and a confirmation indicator separate from said exposure count indicia for providing a visual confirmation indication that a first available frame is positioned for exposure in the camera, is characterized in that:

a pointer is supported to move from pointing to a pre-initialization one of said exposure count indicia for visually indicating that the first available frame has not been positioned for exposure in the camera to pointing to a successive one of said exposure count indicia for visually indicating that the first available frame is positioned for exposure; and said confirmation indicator is capable of modifying light transmitted through it to prevent objects behind it from being clearly seen, and is fixed adjacent said pre-initialization one of the exposure count indicia to cover said pointer when the pointer points to said pre-initialization one of the exposure count indicia, in order that said pointer cannot be clearly seen, but not to cover said pointer when the pointer points to said successive one of the exposure count indicia, in order that said pointer can at least be partially clearly seen, whereby the changeover from said pointer not being clearly seen to being at least partially clearly seen provides said visual confirmation.

2. An exposure count indicator as recited in claim 1, wherein said confirmation indicator includes a light-modifying optical element to prevent said pointer from being clearly seen.

3. An exposure count indicator as recited in claim 2, wherein said optical element is a filter to absorb color selectively.

4. An exposure count indicator as recited in claim 2, wherein said optical element is translucent to diffuse light.

5. An exposure count indicator as recited in claim 2, wherein said exposure count indicia are aligned in a circle, and said optical element is radially adjacent said pre-initialization one of the exposure count indicia.

6. An exposure count indicator comprising a scale of successive exposure count indicia for visually indicating which film frame is positioned for exposure in a camera, and a confirmation indicator separate from said exposure count indicia for providing a visual confirmation indication that a first available frame is positioned for exposure in the camera, is characterized in that:

a pointer is supported to move from an original setting for visually indicating that the first available frame has not been positioned for exposure in the camera to a film initialization setting pointing to a particular one of said exposure count indicia for visually indicating that the first available frame is positioned for exposure; and said confirmation indicator is capable of modifying light transmitted through it to prevent objects behind it from being clearly seen, and is fixed in place to cover said pointer when the pointer is in the original setting, in order that said pointer cannot be clearly seen, but not to cover said pointer when the pointer points to said particular one of the exposure count indicia, in order that said pointer can be at least partially clearly seen, whereby the changeover from said pointer not being clearly seen to being at least partially clearly seen provides said visual confirmation.

* * * * *